UNITED STATES PATENT OFFICE.

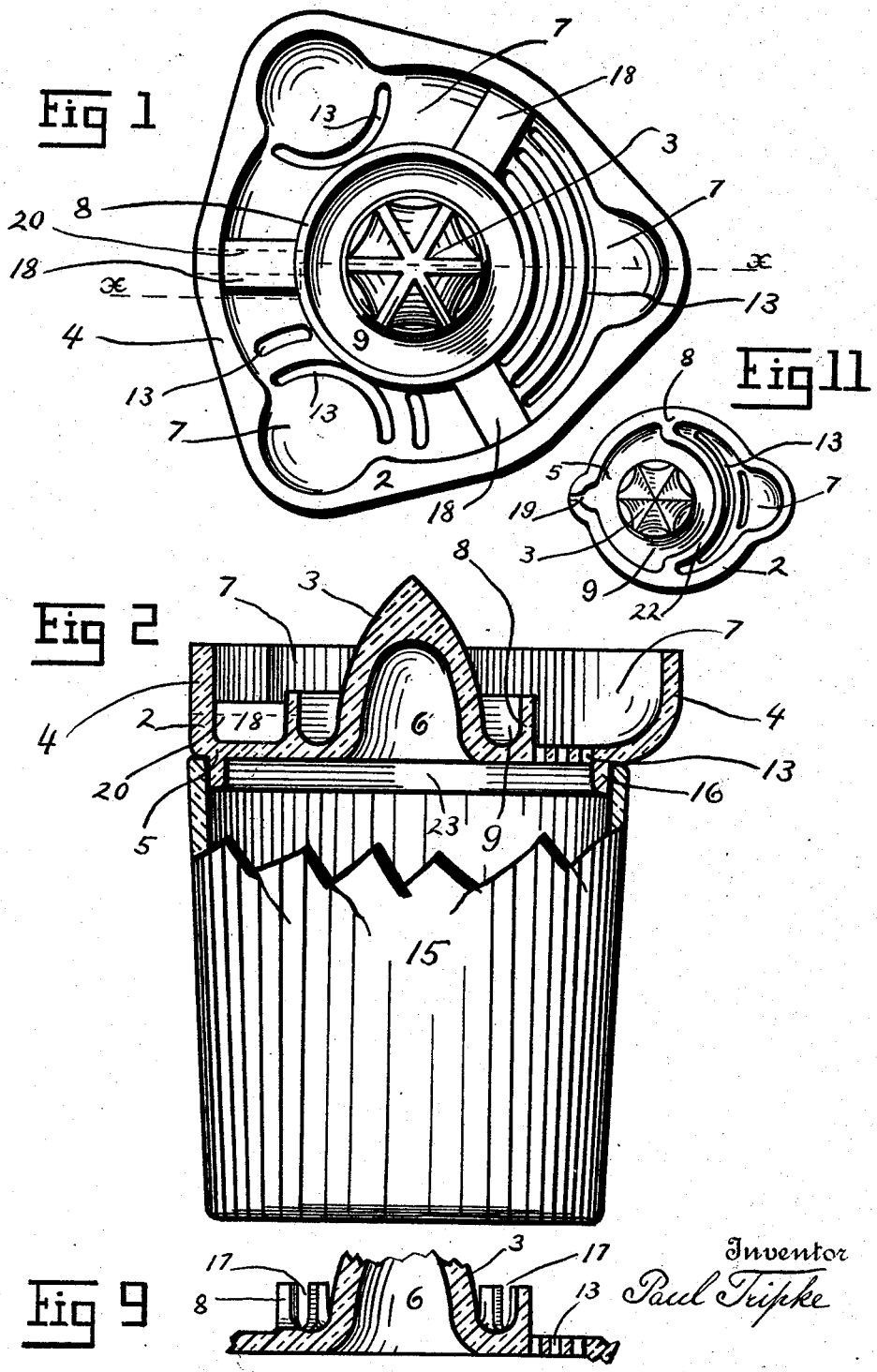

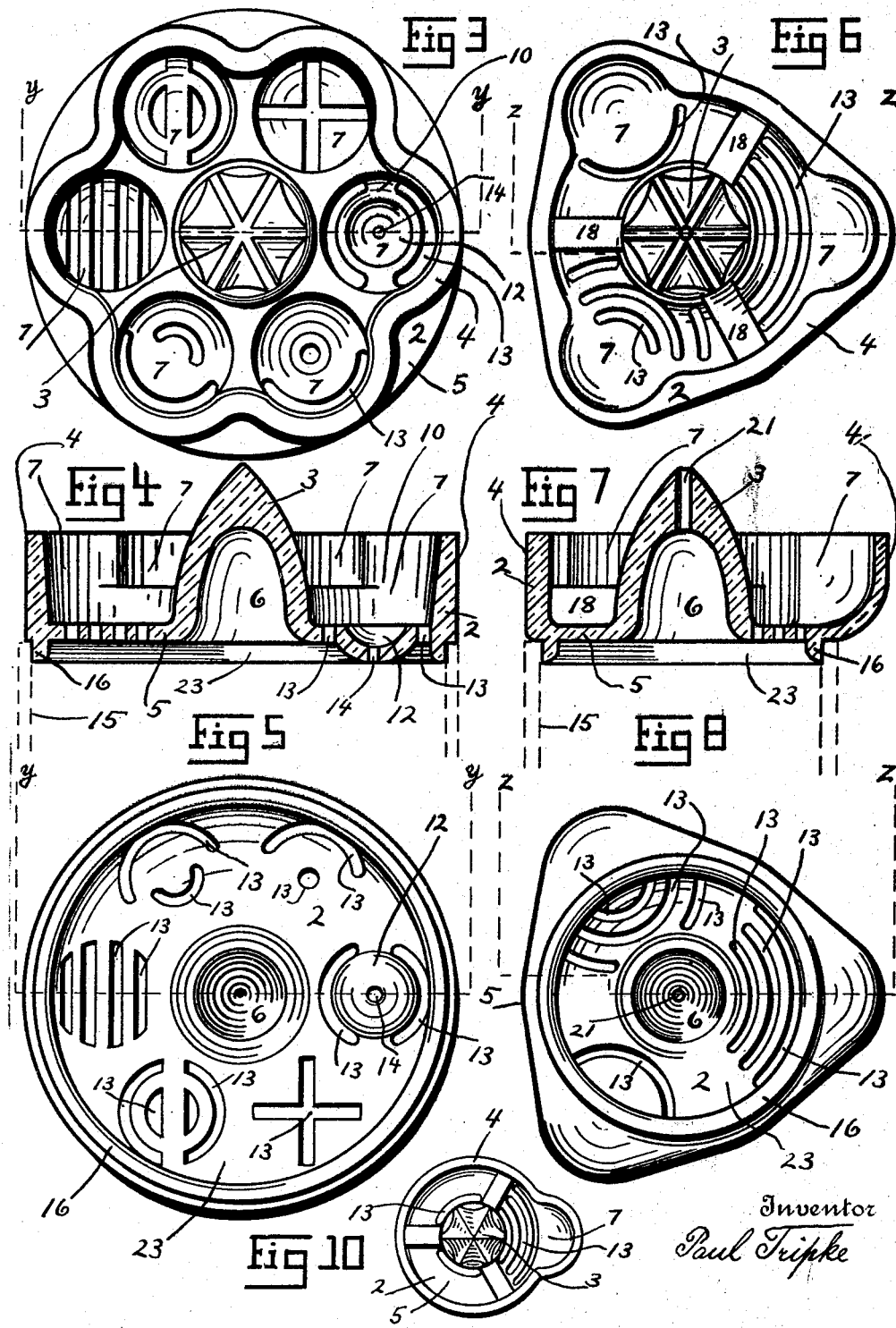

PAUL TRIPKE, OF JERSEY CITY, NEW JERSEY.

COMBINED EGG-SEPARATOR AND JUICE-EXTRACTOR.

1,327,929.  Specification of Letters Patent.  Patented Jan. 13, 1920.

Application filed February 16, 1916. Serial No. 78,692.

*To all whom it may concern:*

Be it known that I, PAUL TRIPKE, citizen of the United States, and resident of Jersey City, in the county of Hudson and State of New Jersey, have invented a certain new and useful Combined Egg-Separator and Juice-Extractor, of which the following is a specification.

My invention relates to a new article of manufacture, and the object is the combination of an egg-separator and a juice-extractor, wherein the article is shaped on one of its surfaces with a juice-extractor and one or a plurality of egg-separators around same.

Figure 1. is a plan view of my improved combined egg-separator and juice-extractor.

Fig. 2. is a cross sectional view on line X—X Fig. 1. the container shown in full lines and partly in section.

Fig. 3. is another plan view of my combined egg-separator and juice-extractor.

Fig. 4. is a cross sectional view of Fig. 3. on line Y—Y part of the container shown in dotted lines.

Fig. 5. is a bottom view of Fig. 3.

Fig. 6. is another plan view of my combined egg-separator and juice-extractor.

Fig. 7. is a cross sectional view of Fig. 6 on line Z—Z part of the container shown in dotted lines.

Fig. 8. is a bottom view of Fig. 6.

Fig. 9. is a detached fragmentary sectional view of the lower portion of the juice-extractor, as shown in Fig. 2 but showing how the retaining wall can be provided with openings or slots.

Fig. 10. is another plan view of my combined egg-separator and juice-extractor (reduced) to show how the article can be formed with only one egg-separator around a juice-extractor.

Fig. 11. is another plan view of my combined egg-separator and juice extractor (reduced) showing how the article can be formed similar to Figs. 1-2, but with only one egg-separator and provided with a pouring spout or lip.

Similar numerals refer to similar parts throughout the specification. Numeral 2 represents the new article of manufacture comprising my combined egg-separator and juice extractor. This article is preferably made of glass, although it can be made of any suitable material. The outer contour of this article may vary, as will be seen, according to the number and shapes of the egg-separators, to be hereinafter more fully described. The article 2 comprises a base 5. The center of the base has integrally formed on one of its surfaces a juice-extractor dome 3 of any desirable height, and suitably provided with ribs and flutings of any shape. The underside of this dome may be provided with a cavity 6 extending a suitable distance in same, see Figs. 2, 4, 5, 7, 8.

The surface of the base, 5, upon which the dome 3 is formed is also formed with one or a plurality of egg-separators 7, all surrounding the said dome 3—in Figs. 1 and 6 three are shown, in Fig. 3 six are shown and in Figs. 10 and 11 one is shown.

However I do not confine myself to any particular number of egg-separators around the juice extractor as I am aware that one or a greater number can be used without effecting or departing from the principle of the invention, which consists in providing one surface of the article with a juice extracting dome and integrally around same with one or a plurality of egg-separators, thus dispensing with the necessity of inverting the article to use it as an egg-separator.

In Figs. 1-2 the surface between the outer flange 4 of the base 5, and the juice extracting dome 3, is integrally provided with an upright retaining or overflow wall 8 of any height, and the space within the wall and dome is intended to serve as a dish or basin 9 to be more fully described hereafter.

I however do not confine myself to the retaining or overflow wall 8 as the article can be made serviceable without the use of the said wall.

These egg-separators 7 are all of a similar construction as to the bowls or dish shaped portions, but the bowl 10, Figs. 3 and 4 is provided with an additional lower bowl 12, formed in the bottom of bowl 10.

These egg-separators or bowls are all provided with orifices 13 cut through the bottom of the same and communicating with the opposite surface of the article (see Figs. 5-8).

But the orifices in bowl 10 are placed and cut through so as to encircle the lower bowl 12. The lower bowl 12 is also provided with an orifice 14 (Figs. 4-5).

All of the orifices may be of any shape, size, or number and as they all serve one and the same purpose it is not necessary to describe them.

Neither do I confine myself to any particular shape of the egg-separators or bowls as I am aware other shapes will accomplish the same result.

This new article of manufacture—combined egg-separator and juice extractor (having one or a plurality of egg separators) is adapted to be placed on the container 15 of any style, size or shape.

The article is held on the container 15 by means of a resting flange 16 integrally formed on the underside of the article, (see Figs. 2–4–7).

I do not confine myself to this method of securing as other means may be used.

To use my invention first place the article 2 on the container 15 (see Fig. 2). If it is intended to extract the juice from a lemon or the like press or squeeze the same upon the dome 3. The juice pulp and seed therefrom will freely run down the flutings of the dome and into the dish or basin 9. Now if a high retaining wall 8 is used the juice pulp and seed will remain in the basin 9 to be afterward poured out of same.

In some cases the article 2 may be provided with a pouring spout or lip 19 as shown in Fig. 11, or one of the webs 18 may be provided with a channel 20, (shown in dotted lines, see Figs. 1 and 2) to act as a discharge for the juice.

If a low retaining wall 8 is used the pulp and seed will enter and remain in the basin or dish 9, and the juice will overflow the wall 8 and run through any of the orifices of one or several egg-separators and thence into the container 15.

I may provide the wall 8 with slots or openings 17 as shown in Fig. 9, to serve as a strainer or grating to withhold the pulp and seed and prevent the same entering the container.

In Fig. 11 the part 22 of the wall 8, which divides the egg-separator from the juice extractor may also be made high to prevent the extracted juice from running into the egg-separator, or low to act as a retaining wall for the seed and pulp and also as an overflow for the juice; or the wall may be provided with slots or openings to act as a strainer for the seed and pulp; said wall is similar to the wall shown in Figs. 2–9.

I do not confine myself to the slots or openings in the wall 8; nor do I confine myself to any particular height of the wall 8.

Of course it is understood that when extracting juice of a lemon or the like on an extractor surrounded by a high wall and basin or dish, the extracting can take place without placing the article 2 on a container.

Now if it is desired to use my article, as an egg-separator, simply break an egg over one of the separator bowls.

If the egg is broken over bowl 10, having lower bowl 12, the yolk of the egg being heavier will settle in the lower bowl and fill same, while the white portion being of less specific gravity will remain above and flow through the orifices into the container. If some of the white portion happens to get below the yolk, it will flow through the orifice in the lower bowl, and thence into the container. If however the egg is broken over any of the bowls 10 without a lower bowl 12 its contents will fall on the bottom of same, the white of the egg will then pass downwardly through the orifices 13, while the yolk being of a more solid nature and compactly held together is prevented from passing through the said orifices.

While one of the bowls is occupied and waiting for the egg-separation to take place, the others can be utilized, thus saving time in separating a number of eggs.

I may in some cases pierce the dome 3 with a central hole 21 (see Fig. 7) for aiding the flow of the juice through same into the container. It can be used for other purposes.

The underside of the article (when inverted) is adapted to be used for extra large eggs and also duck eggs, which require an egg-separator of large capacity owing to their bulk.

In that case the cavity in the underside of the dome 3 will act as a lower bowl for the yolk of the egg to settle in, and the surrounding orifices in part 23 for the white portion to run through; the separating of the egg being accomplished in a similar manner as over lower bowl 12 in Fig. 4.

If the central hole of the dome 3 is used, it will also serve the same purpose as the central orifice in lower bowl 12.

I may in some cases provide the article 2 with webs 18 (see Figs. 1–6–7) for the purpose of strengthening the surface of the article between the egg separators 7 and also forming a division wall between the separators but as the webs are not absolutely necessary they may (in certain cases) be dispensed with, without departing from the invention.

What I claim is:

1. A new article of manufacture, a base integrally formed into a dish or bowl having a central raised portion and a projecting or extending lipped portion, orifices, at intervals encircling said raised portion and piercing said base, said dish with said lipped portion adapted to hold the contents of an egg, said lipped portion to retain the yolk and said orifices to discharge the white.

2. A new article of manufacture, a dish or bowl shaped base having a plurality of lipped portions and a central raised portion, said raised portion dividing said lipped portions and said dish, orifices, at intervals encircling said raised portion and piercing said base, each of said lipped portions with part of said dish adapted to hold the contents of an egg, said lipped portion to retain the yolk and said orifices to discharge the white.

3. A new article of manufacture, a base, an integral resting flange formed on one surface of said base, a cavity pressed in said surface and with its outer wall projecting above the opposite surface of said base, orifices, piercing said surface between said flange and said cavity and communicating with said opposite surface, said opposite surface integrally formed into a bowl or dish with an extending or projecting lipped portion, said lipped portion extending or projecting beyond the said resting flange, said bowl spaced, by a plurality of integral ribs and also by said outer wall into a plurality of smaller bowls, one of said smaller bowls with said lipped portion adapted to hold the contents of an egg, said projecting lipped portion adapted to retain the yolk and said orifices to act as discharge passages for the white.

4. A new article of manufacture, a base provided with an integral dome or raised portion on one surface, a plurality of integral egg-separators surrounding said dome, orifices piercing said egg-separators and communicating with the opposite surface of said base, an integral resting flange on said opposite surface surrounding said orifices, each of said egg-separators adapted to hold the contents of an egg, retain the yolk and through said orifices discharge and separate the white, said plurality of egg separators also adapted to separate the yolk from the white of a plurality of eggs at one time.

5. A new article of manufacture, a base having two surfaces, a basin formed integrally out of one surface of said base, a cavity pressed in said basin and said surface and extending with its outer wall above the opposite surface of said base, a flange integral with the outer edge of said opposite surface and forming with said opposite surface a bowl or dish around said cavity's outer wall, ribs integrally connecting said cavity's outer wall with said flange and spacing said bowl into a plurality of smaller bowls, orifices piercing said basin and connecting with said bowls, each of said smaller bowls adapted to hold the contents of an egg, retain the yolk and through said orifices discharge and separate the white.

6. A new article of manufacture, a base having two surfaces, an integral circular flange formed near and around the edge of one of said surfaces and adapted to act as a seat and also adapted to form a basin with the face of said surface, a cavity pressed in said surface and projecting with its outer wall above the opposite surface of said base, an outer flange integral with said opposite surface and partly following the contour of said circular flange and partly projecting or extending beyond and forming with said opposite surface a bowl or dish, ribs, integrally connecting said outer flange and said cavity's outer wall and spacing said dish into a plurality of smaller bowls, said ribs and said partly projecting outer flange and said cavity's outer wall with said opposite surface constituting the said smaller bowls, orifices, piercing said basin between said cavity and said circular flange and communicating with said bowls, each of said smaller bowls adapted to hold the contents of an egg, retain the yolk and through said orifices discharge and separate the white.

7. A new article of manufacture, an invertible egg-separator, comprising a base having two surfaces one of said surfaces shaped into a basin having a central cavity, said cavity pressed into said base and extending with its outer wall above the opposite surface of said base, a plurality of egg-separator bowls integral with said opposite surface and encircling said cavity's outer wall, orifices at intervals encircling said outer wall and piercing said base and communicating with said basin, said egg-separator bowls adapted to separate the yolk from the white of a plurality of eggs at one time, said basin and said cavity adapted when inverted to hold the contents of an extra large egg, said cavity to retain the yolk and said orifices to discharge and separate the white.

Signed at Jersey City in the county of Hudson and State of New Jersey this 14th day of February A. D. 1916.

PAUL TRIPKE.

Witnesses:
H. F. BESON,
FRED KUHLMANN.